Jan. 13, 1970 H. M. McCONNELL 3,489,522
ELECTRON SPIN RESONANCE LABELING OF BIOMOLECULES
Filed Oct. 15, 1965
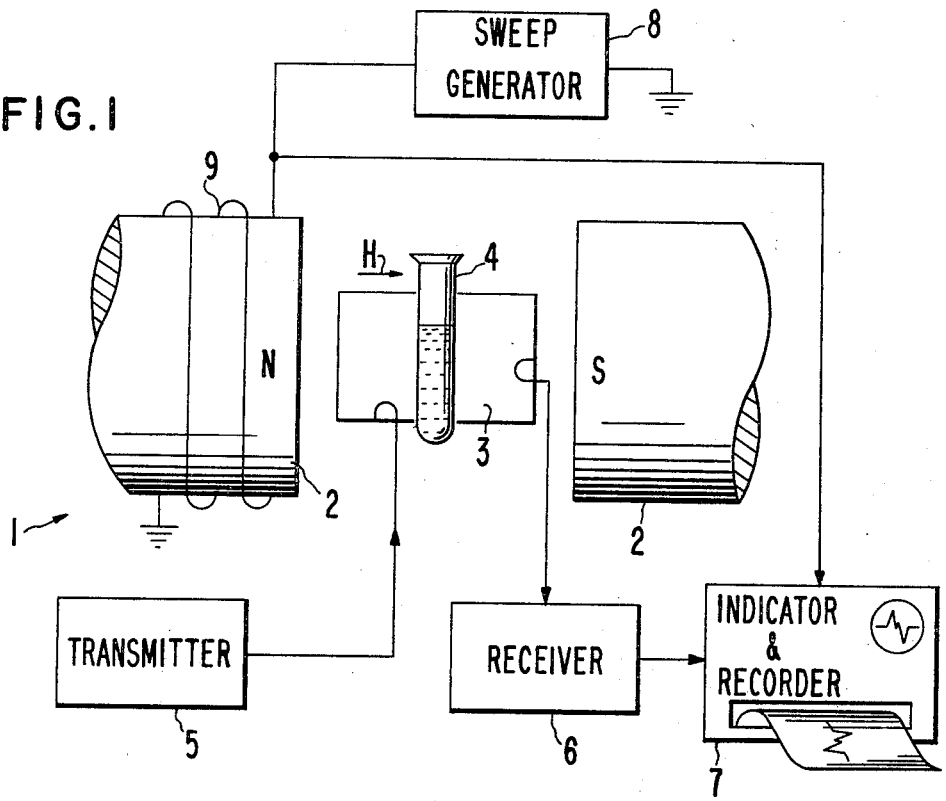
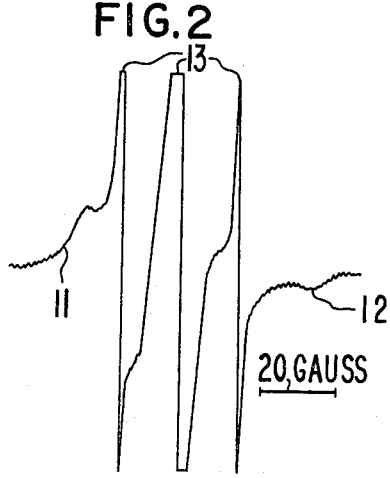
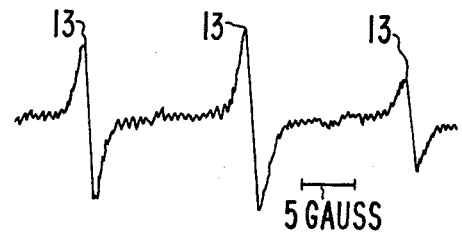
INVENTOR.
HARDEN M. MC CONNELL
BY
ATTORNEY

United States Patent Office 3,489,522
Patented Jan. 13, 1970

3,489,522
ELECTRON SPIN RESONANCE LABELING OF BIOMOLECULES
Harden M. McConnell, Stanford, Calif., assignor, by mesne assignments, to Synvar Associates, Palo Alto, Calif., a partnership of California
Filed Oct. 15, 1965, Ser. No. 496,622
Int. Cl. G01n *33/16;* C12k *1/04;* G21h *5/00*
U.S. Cl. 23—230                                   7 Claims

ABSTRACT OF THE DISCLOSURE

Analytical examination of biologically active molecules through electron spin resonance spectra. Electron spin resonance is provided by a free radical organic molecule that is initially chemically bonded to the biologically active molecule. The spectrum of the combination of the two molecules is then obtained.

---

The present invention relates in general to electron spin resonance (ESR) labeling of biomolecules and more particularly to novel methods for ESR labeling of biologically active molecules to novel ESR labeled compositions of matter and methods of synthesizing same, and to methods for observing the nature of labeled biomolecules. Such novel methods and compositions are especially useful, for example, for determining the structure of certain biomolecules, the nature of chemical reactions involving same, and for tracing the movement of biomolecules in live biological systems.

Heretofore, attempts have been made to determine the nature of certain special biomolecules, characterized by having a naturally occurring ESR spectra, by observing ESR of the biomolecule. Such prior experiments have yielded but little information because the naturally occurring ESR spectra have been unduly complicated with fine structure giving a poor signal-to-noise ratio and because such naturally occurring biomolecules are rare. Other prior experimenters have observed artifically produced ESR spectral lines in biomolecules by irradiating certain biomolecules with ionizing radiation to produce the ESR line; however, such experiments yielded little information because the ionized molecules are unstable and thus remained paramagnetic for such a short period of time that it was practically impossible to trace such molecules or to obtain information concerning changes in the molecule's structure with time.

Still other prior experimenters have labeled certain biomolecules by incorporating radioactive atoms or molecules, thus rendering the biomolecules detectable by conventional nuclear radiation detectors, but such techniques have introduced sometimes undesired radioactivity into a biological system. Furthermore, the direct information gained by this method is limited to determining the whereabouts and quantity of the radioactively labeled molecules.

In the present invention, synthetic organic labeling molecules are provided which have a strong ESR line spectrum, which are readily attachable to many different kinds of biomolecules and which form stable ESR labeled molecules in the biological environment. In addition, methods are provided for observing the presence, movement, structure and nature of reactions involving such ESR-labeled biomolecules. For example, chlorpromazine, a synthetic organic tranquilizer drug, is ionized by oxidation to form a chlorpromazine positive ion radical (cpz$^+$) having a strong ESR spectrum. This radical, cpz$^+$, is then added to a solution of calf thymus DNA, a large helical-shaped biomolecule. The ESR spectrum of the cpz$^+$ which now forms a spin label bonded to DNA is then observed for new flow conditions, flow perpendicular to the static magnetic field, and flow parallel to the magnetic field. Flowing the solution of DNA through a capillary tube in the ESR spectrometer cavity serves to align the axes of the large helical DNA biomolecules parallel to the direction of fluid flow due to laminar shear forces produced in the fluid. By observing and comparing the ESR spectra of cpz$^+$ for the three conditions of flow, it is possible to ascertain that cpz$^+$ is bonded to the DNA with the plane of the aromatic ring portion of the chlorpromazine ion oriented perpendicularly to the helix axis of the DNA. Thus, the spin labeling of drugs and other biomolecules allows ESR techniques to be employed to obtain a wealth of information about the structure and interactions of such labeled molecules. The same information would be impossible or very difficult to obtain by other means of chemical analysis such as viscosity and optical rotation measurements.

The advantages of ESR labeling of biomolecules with synthetic organic spin labels according to the teachings of the present invention include the advantage of stability of the label in biological environments and the more universal application of such spin labels to biomolecules in general. In addition, these synthetic spin labels provide stronger and less complicated ESR lines than heretofore obtained, thus yielding greater sensitivity in such measurements. Moreover, as will be described more fully below, certain of these synthetic organic spin labels such as cpz$^+$ attach by bonding themselves primarily only to certain types of biomolecules such as DNA and RNA while other synthetic labels are more general and can be attached in one form or another to most every type of biomolecule. Still other ones of the synthetic labels are specific, i.e., preferentially attachable to only certain types of groups, i.e., SH groups in protein, thereby permitting selective labeling of only certain parts of biomolecules. By observing the ESR spectra of such specific labels and comparing changes in the spectra of these specific labels compared to changes in spectra of other labels attached to another part of the same biomolecule or of other labeled biomolecules involved in a molecular interaction, much important information can be obtained concerning the molecular structure and/or the nature and rates of the molecular interactions.

The principal object of the present invention is the provision of synthetic organic ESR labels for biomolecules and methods of label attachment and observation of labeled molecules, whereby information, for example, concerning the molecular structure, motion or reaction rates and nature of the interactions between sets of biomolecules may be obtained.

One feature of the present invention is the provision of synthetic organic ESR labels attached to biomolecules.

Another feature of the present invention is the provision of methods for attaching synthetic organic ESR labels to biomolecules.

Another feature of the present invention is the provision of the methods for obtaining information concerning the structure, motion, or interactions involving ESR-labeled biomolecules.

Other features and advantages of the present invention will become apparent upon perusal of the following specification taken in connection with the accompanying drawings wherein:

FIG. 1 is a schematic block diagram of an ESR spectrometer useful for observing and recording ESR spectra of the spin labeled biomolecules of the present invention, FIG. 2 is a high gain ESR spectrum of a nitroxide labeled bovine serum albumin, and FIG. 3 is a lower gain ESR spectrum of the labeled biomolecules of FIG. 2 after digestion by pepsin enzyme.

A $pz^+$ (promazine free radical ion) radical label is prepared from any of the promazine derivatives of the general formula

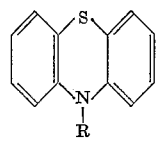

where R is hydrogen or a monovalent organic group.

Best results are obtained where R is an organic group and not hydrogen. For example, the N-dimethyl-3-propylamine group of chloropromazine has been shown to produce beneficial results. Alternatively, any alkyl, aminoalkyl or other group commonly found attached to the nitrogen atom of the promazine molecule could be used.

Substituents elsewhere on the promazine molecule are of little consequence for present purposes. For example, the presence or absence of the chlorine atom of chlorpromazine does not signficantly affect the utility of the free radical form of the molecule as a label. Other substituents on the rings therefore produce promazine derivatives within the scope of this invention.

To convert the molecule to the resonating form, any suitable oxidizing agent may be employed. In the preferred embodiment a persulfate oxidation is employed according to the procedure of D. C. Borg and G. C. Cotzias, Proc. Nat'l Acad. Sci. U.S. 48, 617, 623 (1962).

Where it is desired to label DNA, the label $cpz^+$ for example is simply mixed with the DNA in a solution and the attaching or process occurs rapidly and unassisted. Thus, a solution of calf thymus DNA has been prepared and labeled by adding $cpz^+$ to such a solution in which the resultant concentration of nucleotide base pairs was $3 \times 10^{-3}$ M. Approximately one $cpz^+$ ion for five base pairs was used. The solution had a pH of 5.0. Stabilized $cpz^+$ labeled DNA was obtained. This material can be studied by observing the ESR spectrum in accordance with the procedures to be described.

Oxidized chlorpromazine and oxidized promazines in general are only one example of a class of suitable labeling compounds. In another embodiment novel nitroxide compounds are synthesized to contain at least one isocyanate group which serves to form a covalent bond with atoms of any biologically active molecule to be labeled. Isocyanate-containing nitroxide compounds are especially useful for labeling most proteins through a conventional reaction between the isocyanate group and the -amino group of the protein molecule. A class of nitroxide compounds exhibiting ESR and useful for spin labeling biologically active molecules are those organic free radicals of the general formula:

where $C_1$ and $C_2$ are tertiary carbon atoms; $C_1$ and $C_2$ are bonded directly to a carbon or fluorine atom; A represents at least one independent organic group and has a total valency of 6 for bonding to said $C_1$ and $C_2$ tertiary carbon atoms (the broken lines between A and $C_1$ and $C_2$ representing 6 saturated bonds); and where A contains a functional group other than a 2,4-dinitrophenyl group, which is operative to form a bond with a biologically active molecule.

As will appear more fully hereinafter, A may represent one or more independent organic groups up to a total of 6 and the functional group serving to form the bond with the biologically active molecule may be present on any one or more of these groups.

Present work has shown that much useful information can be gained where A in the above formula includes a plurality of carbon atoms arranged to form a closed ring with $C_1$ and $C_2$ and where $C_1$ and $C_2$ are further substituted with lower alkyl groups so as to provide the requisite tertiary character for $C_1$ and $C_2$. These materials may be defined as having the general formula:

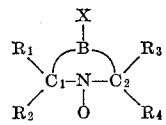

wherein $R_1$, $R_2$, $R_3$ and $R_4$ are lower alkyl groups, i.e., each having about 1–5 carbon atoms; B represents a plurality of carbon atoms in a partial cycloalkyl chain, i.e., an alkylene group, and X is an isocyanate or isothiocyanate group on B.

In this latter situation it will be appreciated that A in the general formula previously discussed comprises four independent organic groups, namely, $R_1$, $R_2$, $R_3$ and $R_4$, and B, the five groups having a total valency of 6 since B is divalent, whereas the R's are monovalent.

Within the group of materials covered by Formula II, an especially useful material is that obtained where $R_1$, $R_2$, $R_3$ and $R_4$ are each a methyl group, B represents an ethylene group or propylene group so as to form a five or six membered heterocyclic ring, respectively, with the nitrogen atom, and X is an isocyanate group attached to one of the carbon atoms in the ethylene group or propylene group.

It is to be noted that whereas the preferred materials include a heterocyclic ring as provided by Formula II the ring structure is not essential so long as the tertiary character of $C_1$ and $C_2$ is retained. Thus, stable molecules of the following type (III) have been reported in the literature and are contemplated within the scope of this invention, Y representing a functional group operative for bonding the "label" to a biologically active molecule.

III 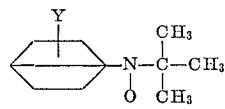

Further, and as already mentioned, $C_1$ and $C_2$ in addition to being tertiary must have all of their valences satisfied by saturated bonds to either carbon atoms or fluorine atoms. For example, in Formula III given above, the replacement of the methyl groups by fluorine atoms would provide typical compounds contemplated within the scope of this invention.

Isocyanate and isothiocyanate functional groups are particularly useful for bonding labels to $\epsilon$-amino groups of proteins. However, the reaction does not appear to be 100% specific for $\epsilon$-amino groups. Evidence has been obtained which indicates that the isocyanate group also attaches to some extent to sulfahydryl groups of proteins although this point of attachment is minor compared to the extent of reaction with an attachment to ε-amino groups.

Preparation of labels having isocyanate functional groups follows conventional organic synthesis procedures. (Where the isothiocyanate derivative is desired, parallel procedures are used as will be clear to those skilled in the art.) In general, there are a number of compounds of various structure known and available containing the the requisite nitroxide group with adjacent tertiary carbon atoms. The present materials may be conveniently prepared from corresponding compounds having the structure of the end product sought with the difference being the presence of an amino group at the site where the isocyanate group is desired. With such a corresponding amino compound, the isocyanate is obtained by a conventional condensation reaction with phosgene in accordance with the following general reaction.

IV    $RNH_2 + ClCOCl \longrightarrow RN{=}C{=}O + HCl$

A typical preparation of an isocyanate-nitroxide label of this invention is as follows:

EXAMPLE A 2,2,5,5 - tetramethyl-3-aminopyrrolidone-1-oxyl is used as a starting material. It may be synthesized from triacetonamine by the method of Rosantzev and Krivitzkaya, Tetrahedron, 21, 491 (1965).

A saturated solution of the amino compound of Rosantzev and Krivitzkaya in dry benzene is added drop-wise at 0° C. to a stirred solution of 12.5% phosgene in benzene (1 mole amino compound to 2 moles phosgene). The end product in accordance with the above general reaction is 2,2,5,5 - tetramethyl - 3 - isocyanatropyrrolidine-1-oxyl.

The benzene solvent can be removed in vacuo at room temperature and the isocyanate product is ready for use as a label.

The isocyanate group, while advantageous for its relative specificity for point of attachment to protein as well as for other reasons, is only exemplary of the functional groups which can be synthesized to form part of the label molecule. Any type of functional group capable of bonding in one way or another with a biologically active molecule is contemplated as an alternative to the isocyanate group.

The functional group of the label and the biologically active molecule can be bonded by a covalent bond such as results from the interaction between isocyanate and an amino group on the biologically active molecule, or it may be non-covalent and fall within a diverse category of recognized bonds, such as an ionic bond, a hydrogen bond, a hydrophobic bond, a dispersion or Van der Waals bond, a charge-transfer or dipole-dipole bond, or a combination of a covalent bond and/or any of the other noted non-covalent bonds.

The type of functional group to be included as part of the nitroxide label molecule will depend largely upon the character of the biologically active molecule to be labeled. Where the moecule is a protein containing ε-amino groups, the isocyanate functional group is a logical choice. However, where the molecule to be labeled has other prevalent reactive sites for bonding purposes, other functional groups may be preferred. For example, where the biologically active molecule has sulfhydryl groups, an imide type functional group may best serve the purpose. For example, a nitroxide label can be prepared with a maleimide functional group according to the following procedure.

EXAMPLE B

Preparation of N-(2,2,5,5-tetramethyl-1-oxylpyrrolidone-3)-maleimide

The general reaction is as follows:

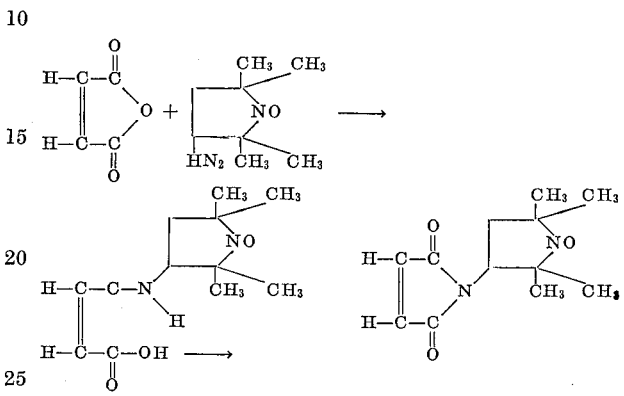

To a room temperature solution of 0.25 gm. of maleic anhydride in 5 ml. anhydrous diethyl ether was slowly added with stirring an equimolar amount (0.40 gm.) of 2,2,5,5-tetramethyl-w-aminopyrrolidine-1-oxyl (I) in 1 ml. of anhydrous diethyl ether. The N-(nitroxide)-maleamic acid (II) immediately precipitated and after three hours of stirring at room temperature the precipitate was filtered, washed ten times with 0.4 ml. of anhydrous diethyl ether, and dried (yield 97%). (Found C, 56.0; H, 7.5; N, 11.3. $C_{12}H_{19}N_2O_4$ requires: C, 56.6; H, 7.5; N, 11.0%.)

In a typical reaction, a mixture of 0.63 gm. N-(nitroxide)-maleamic acid (II), 5 ml. acetic anhydride, and 0.12 gm. sodium acetate were stirred in a tightly closed container for twenty-four hours at 25–35° C. The acetic anhydride was removed in vacuo at room temperature and the crude product was obtained as a viscous oil. The N-(nitroxide)-maleimide may be purified by molecular distillation.

Both the crude and the purified product III has been shown to combine preferentially with sulfhydryl groups (over amino groups) in bovine serum albumin.

The above discussion exemplifies two types of biologically active molecules, i.e. protein containing ε-amino groups and biologically active molecules containing sulfhydryl groups which may also be protein molecules. However, the invention is applicable to all "biologically active molecules," the term being used in the broadest sense to include all molecules affecting the life processes from a chemical standpoint. "Biologically active molecules" within the present context include for examples, the following types of materials.

TABLE I (I) Nucleic acids
  (a) DNA
  (b) RNA (II) Proteins
  (a) Enzymes
  (b) Albumins, as serum albumin
  (c) Globular proteins, as antibodies
  (d) Structural proteins, as, for example, the proteins in hair (e) Synthetic polypeptides, that are used as, for examples, models of biological molecules.
(f) Lipo-proteins, as, for example, in the brain.

(III) Nucleo-protein (a) Nucleo-histones
(b) Nucleo-protamines (IV) Other biologically active molecules (a) Antibodies
(b) Drugs, such as for example, the tranquilizer, chlorpromazine.
(c) Antigens, such as, for example, molecules containing the 2,4-dinitrophenyl group
(d) Toxins

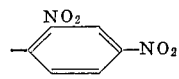

From the diversity of the above exemplary list of biologically active molecules it will be appreciated that the spin label should be synthesized with the properties of the biologically active molecule in mind. In most cases, it will simply be a matter of adapting a known reaction of the biologically active molecule. The nitroxide group with its adjacent tertiary carbon atoms are conveniently formed as part of a molecule that is known to form a bond with the biologically active molecule.

It has already been illustrated how the reactivity of the isocyanate group and maleimide groups are utilized. To illustrate the other types of bonding required with some of the molecules in the above list, the labeling of an antibody can be used. To label an antibody at its active site, with the present nitroxide materials, a functional group can be used of a type that forms a non-covalent bond with the antibody. In order to accomplish this the nitroxide label can be obtained as part of a molecule structure which includes a ketone group. A dinitrophenyl hydrazone derivative of the ketone will provide the requisite functional group for bonding to antibodies. The preparation of this type of label is illustrated by the following equation:

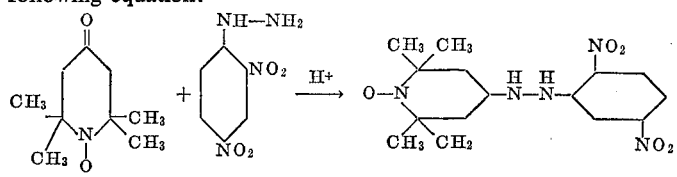

The end product hydrazone derivative has been demonstrated to label antibodies formed by rabbits which are known to be specific to the 2,4-dinitrophenyl group and to form a bond therewith. The preparation of this derivative illustrates the broader concept of the invention which contemplates selecting a functional group known in the art to be operable for bonding to a particular biologically active molecule. The selected functional group is then included in a molecular structure with the discussed nitroxide grouping by conventional organic synthesis.

It is interesting to observe that the functional group to be integrated with the nitroxide group may be part of a molecule otherwise considered a biologically active molecule within the broad meaning of the term as here used. In other words, some biologically active molecules may serve as a functional group for bonding the nitroxide group to other biologically active molecules. In using such materials the first step in effect would be the labeling of a biologically active molecule with the nitroxide group. The so labeled biologically active molecule in turn serves as an integral unit as a label for another biologically active molecule. To illustrate this point an antibiotic (considered as a biologically active molecule herein) can be labeled with a nitroxide grouping by suitable synthesis procedures of the type discussed. The so labeled antibiotic can in turn be used to label DNA which is also a biologically active molecule if the antibiotic selected in the first instance is one that reacts specifically with DNA.

In selecting a functional group for bonding purposes it is possible to choose materials which in and of themselves may serve as a label of a different type. For example, if a dye such as a fluorescent dye molecule is chemically integrated with a molecular structure including the nitroxide group and the dye is of the type which will bond with biologically active molecules, the result is a biologically active molecule labeled both with the dye and with the resonating nitroxide group. A great deal of work has been done in the area of conjugating proteins with fluorescent dyes. Reference to such work will quickly reveal those dyes which are suitable for the biologically active molecule at hand and by chemically combining such a dye with the nitroxide structure in a single molecule in conventional fashion, a suitable spin label is obtained. To illustrate this approach to multi-labeling the following example is given.

EXAMPLE C 1-dimethylaminonaphthalene-5-(N-nitroxide)-sulphonamide

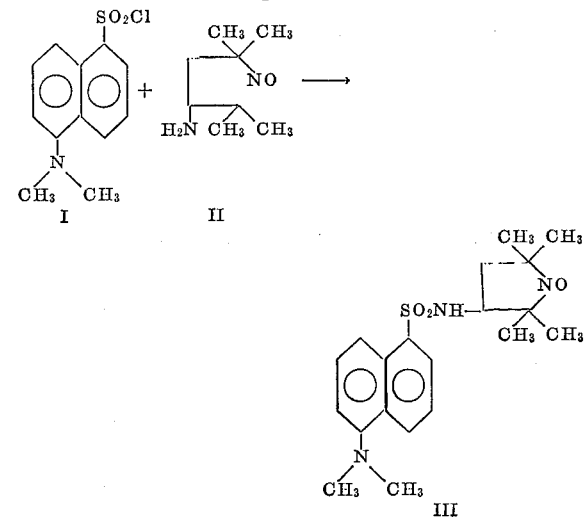

A solution of 0.28 gm. 1-dimethylaminonaphthalene-5-sulfonyl chloride (Aldrich Chemical Co.) (I) in 5 ml. reagent grade acetone was filtered and added to 0.20 gm. (20% excess) 2,2,5,5-tetramethyl-3-aminopyrrolidine-1-oxyl (II) in 1 ml. acetone. The solution was stirred for two hours at 25–35° C. and the acetone was removed in vacuo. The yellow solid was dissolved in ether and extracted repeatedly with an aqueous buffer (pH 6.8) to remove unreacted amine (I). The ether extract was chromagraphed on a silica column and was eluted with acetone. The resulting sulphonamide (III) contains ~1.0 spin/mole and the optical spectrum in ethanol exhibits a maximum $\lambda_{max}=337_{m\mu}$, $\epsilon_{max}=4,000$ cm.²/millimole in the region characteristic of dimethylaminonaphthalenesulphonamides. In 95% glycerol (25° C.) the emission maximum occurs at 530m$\mu$ and the fluorescent lifetime is approximately 14 nanoseconds.

The sulphonamide prepared in the above example contains both the nitroxide label group and a fluorescent dye label grouping. This molecule has been shown to bond with bovine serum albumin and the double label characteristics observed.

Dyes illustrate one possibility of a second label. Other possibilities include the synthesis of a nitroxide molecule with the requisite functional group for bonding purposes wherein the molecular structure also includes a radioactive element. In addition to the spin label trace, a radioactive trace can be obtained in the usual fashion.

The above example also illustrated the selection of a functional grouping for puroposes of bonding the nitroxide to another type of biologically active molecule (bovine serum albumin). Here the dye group has been utilized for forming a non-covalent bond between the bovine serum albumin and nitroxide containing molecule.

Once the label molecule has been synthesized to contain both the nitroxide group and the functional group needed for bonding purposes, the mechanics of combining the label with the selected biologically active molecule is straightforward. The mere combination of the label molecule and the biologically active molecule to permit contact between the two in a suitable solvent such as an aqueous medium is sufficient to achieve attachment of the label to the biologically active molecule.

Referring now to FIG. 1 there is shown a conventional ESR spectrometer 1 used for observing the ESR spectral lines of the labeling group. The spectrometer comprises an electromagnet 2 for producing a strong unidirectional magnetic field H as of 3 to 10 kg. in the gap of the magnet 1. A cavity resonator 3 is immersed in the magnetic field H. A sample container 4 such as a glass vial is located within the cavity 3. The cavity 3 is dimensioned and excited with R.F. wave energy derived from a transmitter 5 in such a manner that the dominant excited mode of the cavity has the R.F. magnetic field oriented at right angles to the direction of the unidirectional magnetic field H.

A microwave receiver 6 is coupled to the cavity 3 in such a manner that there is a signal coupled from the transmitter to the receiver through the intermediary of the sample only during resonance of the ESR line spectrum of the sample under analysis disposed in the sample container 4. The receiver 6 converts the microwave resonance signal to a DC signal and the output of the receiver 6 is fed to an indicator and recorder 7 for indicating and recording the resonance signal as a function of a sweep signal obtained from a sweep generator 8.

The sweep generator 8 serves to sweep the intensity of the unidirectional magnetic field via coil 9 through the electron resonance conditions of the labeling group, whereby the ESR spectrum of the labeling group is indicated and recorded at 7.

Important information concerning the structure and nature of chemical reactions involving large biologically reactive molecules can be obtained by comparing the recorded spectra of the ESR labeling chemical obtained before, during and after certain molecular interactions. For example, important information concerning the structure of enzyme interactions with bovine serum albumin (BSA) is obtained by spin labeling BSA with 2,2,5,5-tetramethyl-3-isocyanatopyrrolidine-1-oxyl radical (nitroxide label) and then observing the ESR spectrum of the nitroxide spin label while the BSA is acted upon, digested, by pepsin enzyme.

Information on the above interaction is obtained as follows: The nitroxide label is prepared as previously described. The nitroxide label is bonded, to BSA by adding it to a solution containing 2.5 gm. of crystalline BSA in 75 ml. of 1% sodium bicarbonate solution. The resulting solution is stirred for 3 days at 0° C. and dialyzed against distilled water. Sufficient label is added initially to produce one or two attached nitroxide label groups per BSA molecule. A high gain ESR spectrum of the labeled BSA at pH 7.5 is taken, as above described, at for example, 9.5 gc. and appears as the graph of FIG. 2.

The ESR spectrum of FIG. 2 is interpreted as follows: BSA is a large tightly randomly coiled biomolecule with a number of amino groups for bonding to isocyanate attaching groups. Certain of the amino groups are on the outside of the BSA molecule while others are deeply buried internally in the BSA molecule. The nitroxide labeled spectrum of the BSA includes a pair of relatively wide and low intensity resonance lines 11 and 12 at both ends of the spectrum. These lines are broad and of low intensity because they are characteristic of the nitroxide labels as bound in a relatively rigid manner to the SH groups deep inside of the BSA molecule. The three other high intensity lines 13 are characteristic of the fast moving nitroxide groups bound to the amino groups on the outside of the BSA molecule.

Now the pepsin digestion of the labeled BSA molecule is observed by adding 0.2 mg. of pepsin into 6 ml. of a 2.5% solution of the nitroxide labeled BSA at pH 2.1. The action of pepsin is stopped at the end of 15 minutes by dilution 20:1 with phosphate buffer of pH 7.5. A second ESR spectrum of the nitroxide label at 9.5 gc. is obtained, as previously described, and appears at FIG. 3. This ESR spectrum is interpreted as follows: The intensity of the three principal lines 13 has increased while the tailing of the central line has decreased, indicating increased motion of the outside nitroxide labeling group which would occur with fragmentation of the BSA molecule. The two broad low intensity lines associated with the immobile deep seated nitroxide groups, have disappeared indicating that the BSA has been fragmented allowing the deep seated nitroxide label groups to tumble freely with the opening up of the BSA protein molecule. Thus one is able to confirm and follow the fragmentation of BSA by pepsin enzyme.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for analytically examining a biologically active molecule comprising: providing a free radical organic molecule having an ESR spectrum and capable of forming a chemical bond with said biologically active molecule; bringing together said biologically active molecule and said free radical organic molecule to form a chemical bond therebetween; and exciting and detecting the electron resonance of the combination of said two molecules.

2. A method in accordance with claim 1 wherein said free radical organic molecule is a synthetic organic promazine.

3. A method in accordance with claim 2 wherein said free radical organic molecule is an organic nitroxide.

4. A method in accordance with claim 3 wherein said organic nitroxide contains a functional group substituent selected from the group consisting of the isocyanate, isothiocyanate and maleimide groups for chemically bonding the nitroxide to said biologically active molecule.

5. The method in accordance with claim 1 and including the step of dialyzing said biologically active molecule after it is chemically bonded to said free radical organic molecule to remove any excess of said free radical organic molecule whereby the signal to noise ratio of the spectrum of the chemical combination of said two molecules is improved.

6. The method in accordance with claim 1 and including the steps of introducing a second molecule with the chemical combination of said two molecules, and exciting and detecting the electron resonance thereof whereby a comparison of the ESR spectrum of the biologically active molecule chemically bonded with said free radical organic molecule before and after interaction with said second molecule yields information concerning the nature of the interaction, if any, therebetween.

7. The method in accordance with claim 6 wherein said second molecule is chemically bonded to a free radical organic molecule having an ESR spectrum prior to said interaction.

References Cited

Beinert et al.: Biochemical and Biophysical Research Communications, vol. 3, No. 1, pp. 41–46 (July 1960).

JOSEPH SCOVRONEK, Primary Examiner

U.S. Cl. X.R.

195—103.5; 250—106; 252—301.1; 324—.5; 424—9